(12) United States Patent
Takahashi et al.

(10) Patent No.: US 11,575,742 B2
(45) Date of Patent: Feb. 7, 2023

(54) INFORMATION PROCESSING DEVICE FOR GENERATING REGISTRATION DATA IN A PEER-TO-PEER NETWORK

(71) Applicant: Sony Corporation, Tokyo (JP)

(72) Inventors: Koki Takahashi, Tokyo (JP); Takehiko Sasaki, Tokyo (JP); Masaaki Isozu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/274,656

(22) PCT Filed: Aug. 22, 2019

(86) PCT No.: PCT/JP2019/032857
§ 371 (c)(1),
(2) Date: Mar. 9, 2021

(87) PCT Pub. No.: WO2020/059410
PCT Pub. Date: Mar. 26, 2020

(65) Prior Publication Data
US 2022/0116449 A1    Apr. 14, 2022

(30) Foreign Application Priority Data
Sep. 20, 2018   (JP) .............................. JP2018-175855

(51) Int. Cl.
*H04L 9/08*     (2006.01)
*H04L 9/32*     (2006.01)
*H04L 9/00*     (2022.01)
*H04L 67/104*   (2022.01)
*G06F 21/64*    (2013.01)
*G06F 21/62*    (2013.01)

(52) U.S. Cl.
CPC ........ *H04L 67/1044* (2013.01); *H04L 9/0869* (2013.01); *H04L 9/3247* (2013.01); *H04L 9/50* (2022.05)

(58) Field of Classification Search
CPC .............. H04L 67/1044; H04L 9/0869; H04L 9/3247; H04L 2209/38
See application file for complete search history.

(56) References Cited

U.S. PATENT DOCUMENTS 9,992,022 B1 * 6/2018 Chapman .............. H04L 9/3236
10,114,969 B1 * 10/2018 Chaney .................. G06F 21/64
(Continued)

FOREIGN PATENT DOCUMENTS

WO   WO 2017/090329 A1   6/2017
WO   WO 2018/163031 A1   9/2018

OTHER PUBLICATIONS

International Search Report dated Nov. 12, 2019 in PCT/JP2019/032857 file Aug. 22, 2019, 2 pages.

*Primary Examiner* — Alina A Boutah
(74) *Attorney, Agent, or Firm* — Oblon, McClelland, Maier & Neustadt, L.L.P.

(57) ABSTRACT

Provided is an information processing device including a registration data generation unit (112) that generates registration data that is registered in a P2P database (120) and that includes encrypted identification information generated through encryption using key information of a subject related to the registration data, the encrypted identification information being used to identify the subject and being different for each registration data.

14 Claims, 17 Drawing Sheets

(56) References Cited

U.S. PATENT DOCUMENTS

| | | | | |
|---|---|---|---|---|
| 2016/0292396 | A1* | 10/2016 | Akerwall | G06F 21/10 |
| 2017/0104589 | A1* | 4/2017 | Lambert | H04L 9/3268 |
| 2017/0124535 | A1* | 5/2017 | Juels | G06Q 20/065 |
| 2017/0149819 | A1 | 5/2017 | Androulaki et al. | |
| 2017/0180128 | A1 | 6/2017 | Lu | |
| 2017/0236123 | A1* | 8/2017 | Ali | G06Q 20/3825 |
| | | | | 705/75 |
| 2017/0330179 | A1 | 11/2017 | Song | |
| 2018/0048461 | A1* | 2/2018 | Jutla | G06Q 20/3829 |
| 2018/0097635 | A1* | 4/2018 | Moses | H04L 63/0442 |
| 2018/0139056 | A1* | 5/2018 | Imai | H04L 9/3247 |
| 2018/0183587 | A1* | 6/2018 | Won | H04W 4/70 |
| 2018/0262493 | A1* | 9/2018 | Andrade | H04L 63/08 |
| 2018/0337771 | A1* | 11/2018 | Baker | H04L 63/061 |
| 2018/0359092 | A1 | 12/2018 | Lu | |
| 2018/0367314 | A1* | 12/2018 | Egner | H04L 9/3239 |
| 2019/0005470 | A1* | 1/2019 | Uhr | H04L 9/3242 |
| 2019/0268466 | A1* | 8/2019 | Inoue | H04L 9/3247 |
| 2020/0013302 | A1* | 1/2020 | Lawrenson | H04L 67/104 |
| 2020/0019963 | A1* | 1/2020 | Nakamura | G06Q 20/389 |
| 2020/0042726 | A1* | 2/2020 | Lawrenson | G06F 21/6245 |
| 2020/0090538 | A1* | 3/2020 | Lawrenson | G06Q 10/0639 |
| 2020/0127818 | A1* | 4/2020 | Watanabe | H04L 9/0822 |
| 2020/0259842 | A1* | 8/2020 | Kitano | G06F 16/27 |
| 2020/0322164 | A1* | 10/2020 | Shirai | H04L 9/0869 |
| 2021/0104167 | A1* | 4/2021 | Lawrenson | G06Q 50/205 |
| 2021/0183486 | A1* | 6/2021 | Sakurada | G16H 50/70 |
| 2022/0029831 | A1* | 1/2022 | Baek | G16Y 30/10 |

\* cited by examiner

INFORMATION PROCESSING DEVICE FOR GENERATING REGISTRATION DATA IN A PEER-TO-PEER NETWORK

TECHNICAL FIELD

The present disclosure relates to an information processing device, an information processing method, and a program.

BACKGROUND ART

In recent years, services each using a peer-to-peer database represented by blockchain data have actively been developed. As examples thereof, Bitcoin using the blockchain data for exchange of virtual currency and the like can be listed. The services each using the peer-to-peer database represented by the blockchain data can prevent falsification of data managed by the peer-to-peer database and guarantee authenticity of the data.

PTL 1 described below discloses a technique which encrypts data managed in a peer-to-peer database with a public key and allows a user for whom the data is intended decrypts the registration data with a secret key held thereby.

CITATION LIST

Patent Literature

[PTL 1]
WO 2017/090329

SUMMARY

Technical Problem

However, depending on the technique disclosed in PTL 1 or the like, it may be difficult to appropriately prevent a subject related to the registration data in the peer-to-peer database from being specified by a third person. More specifically, when the registration data in the peer-to-peer database includes identification information of the subject related to the registration data (such as, e.g., an individual for whom the registration data is intended), the subject related to the registration data may be specified by the third person based on another public information (such as, e.g., public information published on a website). For example, when the identification information of the subject related to the registration data is published on a website, the third person viewing the website can specify the subject related to the registration data based on a match between the identification information published on the website and the identification information included in the registration data in the peer-to-peer database.

The present disclosure has been achieved in view of the circumstances described above and provides an information processing device, an information processing method, and a program which are novel and improved and can appropriately prevent a subject related to registration data in a peer-to-peer database from being specified by a third person.

Solution to Problem

The present disclosure provides an information processing device including: a registration data generation unit that generates registration data that is registered in a P2P and that includes encrypted identification information generated through encryption using key information of a subject related to the registration data, the encrypted identification information being used to identify the subject and being different for each registration data.

The present disclosure also provides an information processing method to be implemented by a computer, the information processing method including: generating registration data that is registered in a P2P database and that includes encrypted identification information generated through encryption using key information of a subject related to the registration data, the encrypted identification information being used to identify the subject and being different for each registration data.

The present disclosure also provides a program for causing a computer to execute: generating registration data that is registered in a P2P database and that includes encrypted identification information generated through encryption using key information of a subject related to the registration data, the encrypted identification information being used to identify the subject and being different for each registration data.

The present disclosure also provides an information processing device including: a communication unit that receives registration data that is registered in a P2P database and that includes encrypted identification information generated through encryption using key information of a subject related to the registration data; and a registration unit that registers each registration data in the P2P database, the encrypted identification information being used to identify the subject and being different for each registration data to another.

Advantageous Effects of Invention

As described heretofore, according to the present disclosure, it is possible to more appropriately prevent the subject related to the registration data in the peer-to-peer database from being specified by the third person.

Note that the effects described above are not necessarily limitative. In addition to or instead of the effects described above, any of the effects shown in the present description or another effect that can be understood from the present description may also be achieved.

DESCRIPTION OF EMBODIMENTS

Figure 1:
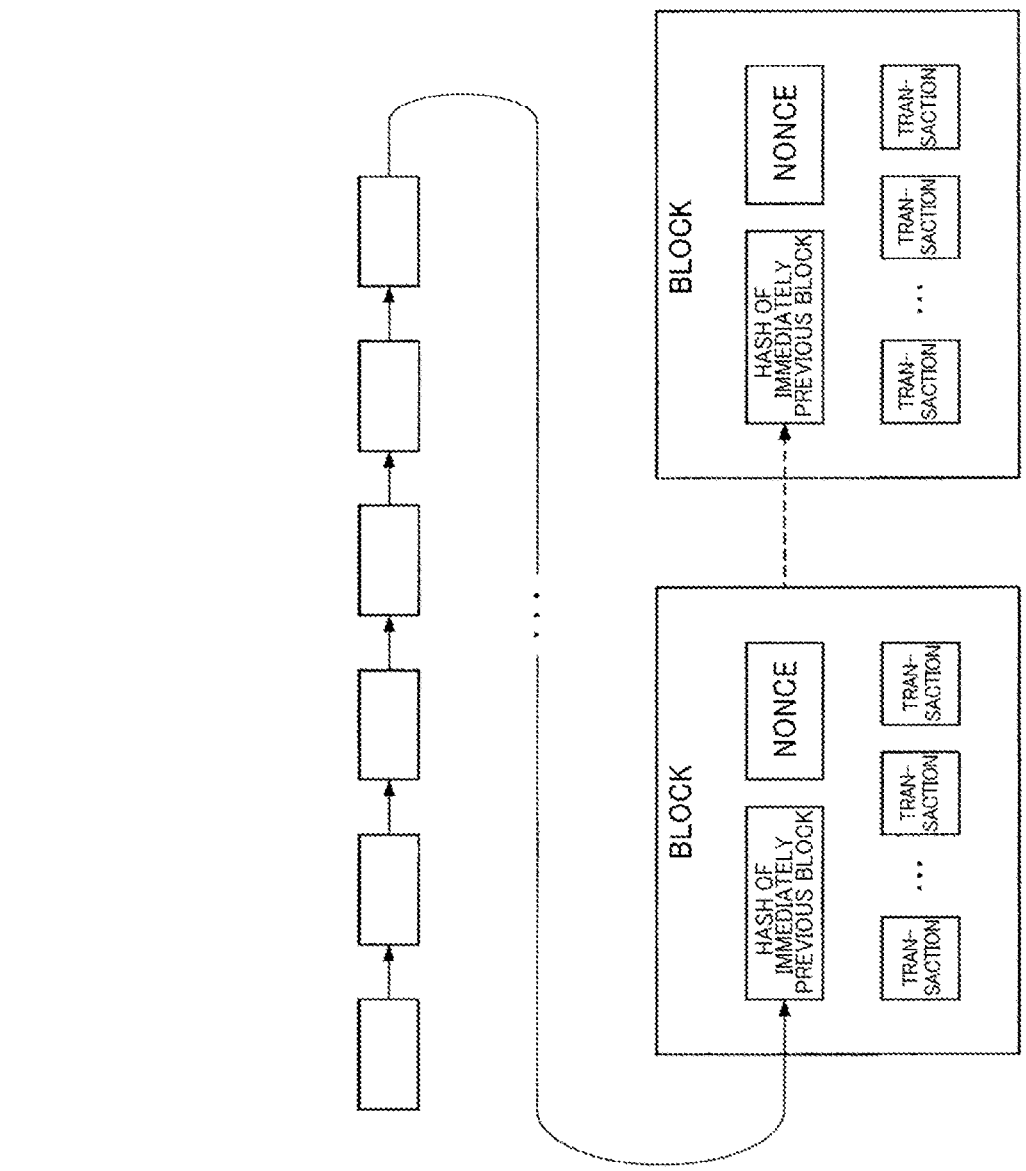
FIG. 1 is a diagram illustrating an outline of blockchain data which is a type of a peer-to-peer database.

Referring to the accompanying drawings, a detailed description will be given below of preferred embodiments of the present disclosure. Note that, in the present description and the drawings, components having substantially the same functional configurations are given the same reference numerals, and a repeated description thereof is omitted.

Note that the description will be given in the following order.
1. Outline of Peer-To-Peer Database
2. First Embodiment
3. Second Embodiment
4. Third Embodiment
5. Example of Hardware Configuration
6. Summary 1. Outline of Peer-To-Peer Database Before a description is given of each of the embodiments according to the present disclosure, a description will be given first of an outline of a peer-to-peer database.

In an information processing system according to the present disclosure, a distributed peer-to-peer database, which is distributed over a peer-to-peer network, is used. Note that the peer-to-peer network may be referred to also as a peer-to-peer distributed file system. The peer-to-peer network may be hereinafter referred to as a "P2P network", while the peer-to-peer database may be hereinafter referred to as a "P2P database". As an example of the P2P database, blockchain data, which is distributed over the P2P network, can be listed. Accordingly, by way of example, a description will be given first of an outline of a blockchain system.

As illustrated in FIG. 1, the blockchain data is data inducing a plurality of blocks which are connected together like a chain. In each of the blocks, one or two or more subject data can be stored as transaction data (a transaction).

As an example of the blockchain data, blockchain data used for exchange of virtual currency data, such as Bitcoin, can be listed. For example, the blockchain data used for the exchange of the virtual currency data includes values referred to as a hash of an immediately previous block and a nonce. The hash of the immediately previous block is information used to determine whether or not a block of concern is a "correct block" correctly continued from the immediately previous block. The nonce is information to be used to prevent spoofing in authentication using the hash and, by using the nonce, falsification is prevented. As an example of the nonce, data representing a character string, a number string, a combination thereof, or the like can be listed.

In the blockchain data, an electronic signature using an encryption key is added to each transaction data to prevent spoofing. Each transaction data is published and shared in the entire P2P network. Note that each transaction data may also be encrypted using the encryption key.

Figure 2:
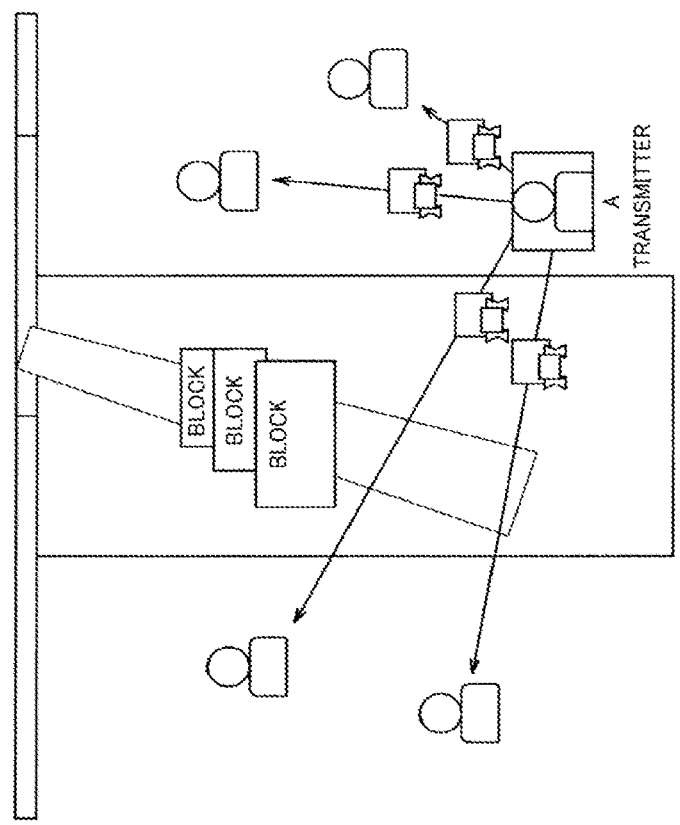
FIG. 2 is a diagram illustrating the outline of the blockchain data which is a type of the peer-to-peer database.

FIG. 2 is a diagram illustrating registration of subject data by a user A in the blockchain system. The user A adds an electronic signature generated using a secret key of the user A to the subject data registered in the blockchain data. Then, the user A broadcasts the transaction data including the subject data with the electronic signature onto the P2P network. This guarantees that a holder of the subject data is the user A.

Figure 3:
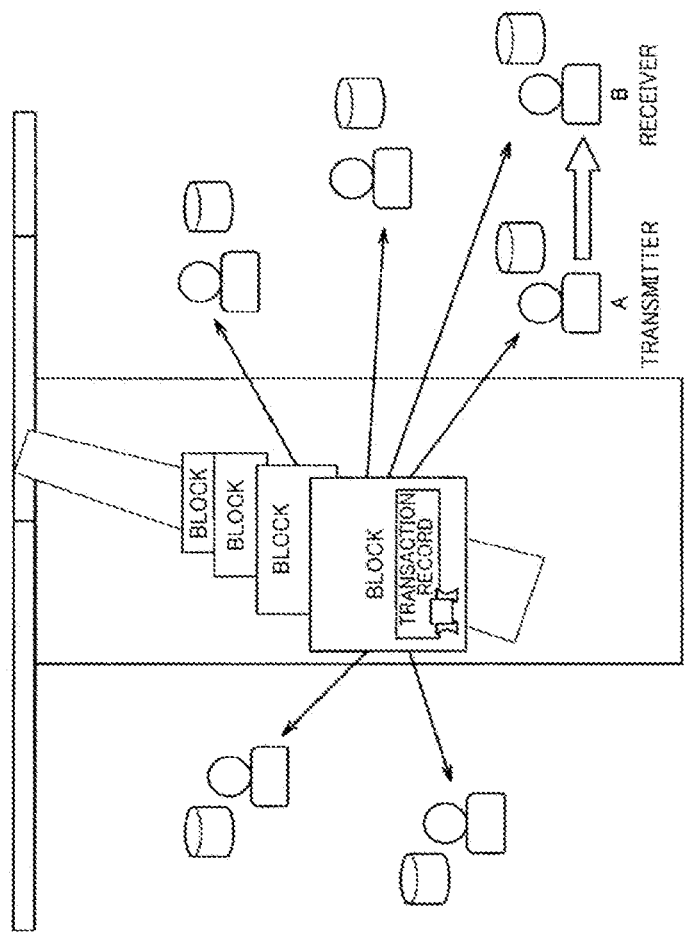
FIG. 3 is a diagram illustrating the outline of the blockchain data which is a type of the peer-to-peer database.

FIG. 3 is a diagram illustrating transfer of the subject data from the user A to a user B in the blockchain system. The user A adds the electronic signature generated using the secret key of the user A to the transaction data and causes the transaction data to include a public key of the user B. This shows that the subject data has been transferred from the user A to the user B. Alternatively, the user B may also acquire the public key of the user A from the user A in a transaction of the subject data and acquire the subject data with the electronic signature or the encrypted subject data.

In the blockchain system, it may also be possible to use, e.g., a side chain technique to cause the blockchain data used in exchange of exiting virtual currency data, such as the Bitcoin blockchain data, to include another subject data other than that the virtual currency data.

2. First Embodiment

The description has been given above of the outline of the P2P database. Subsequently, a description will be given of the first embodiment according to the present disclosure.

(2. 1. Example of System Configuration)

Figure 4:
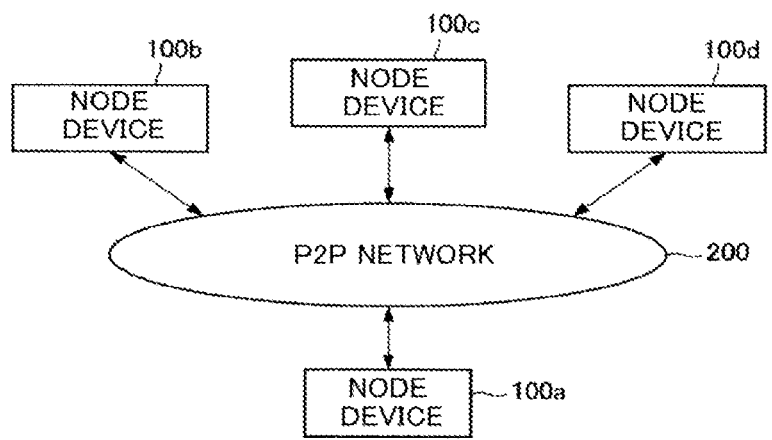
FIG. 4 is a diagram illustrating an example of a system configuration of an information processing system according to a first embodiment.

First, referring to FIG. 4, a description will be given of an example of a system configuration of an information processing system according to the first embodiment. As illustrated in FIG. 4, the information processing system according to the first embodiment includes a plurality of node devices 100 (which are node devices 100a to 100d in the drawing). These node devices 100 are connected to each other by a P2P network 200.

(Node Device 100)

Each of the node devices 100 is an information processing device which holds a P2P database and performs registration of a data in the P2P database, acquisition of the data from the P2P database, and the like.

A more specific description will be given of the registration of the data in the P2P database. Each of the node devices 100 according to the present embodiment performs encryption using key information of a subject related to registration data in the P2P database to generate encrypted identification information. The encrypted identification information is information used to identify the subject (subject related to registration data in the P2P database), which differs for each registration data.

The "subject related to registration data in the P2P database" refers to, e.g., a subject related to details of the registration data (e.g., an individual when the registration data is an evaluation data of the individual), a side which provides (generates) the registration data, a side to which the registration data is provided, or the like. These include an individual, an organization (such as, e.g., a company or a group), a device (such as, e.g., a server or a sensor device), a system, and the like, but are not limited thereto. In other words, the "subject related to registration data in the P2P database" includes a tangible entity, an intangible entity, or the like having any relationship with the registration data. In this description, by way of example, a description will be given of a case where the "subject related to registration data in the P2P database" is an individual related to the details of the registration data (e.g., an individual for whom the evaluation data is intended), and the node device 100 is a device of a company which registers the registration data related to the individual in the P2P database. Note that, in this description, the "subject related to registration data in the P2P database" may be referred to also as the "subject related to the registration data" or merely referred to also as the "subject".

Then, the node device 100 generates the registration data including the generated encrypted identification information and registers the registration data in the P2P database. As described above, when the registration data in the P2P database includes the identification information of the subject related to the registration data, the subject related to the registration data may be specified based on another public information (such as, e.g., public information published on a website). Meanwhile, the node device 100 stores the encrypted identification information described above in the registration data in the P2P database and can thus appropriately prevent the subject related to the registration data from being specified. More specifically, since the encrypted identification information is the information which differs for each registration data, even when one identification information set indicating the subject is published on a website or the like, the subject related to the registration data in the P2P database is prevented from being specified. Details of a method of generating the encrypted identification information, an example of a configuration of the registration data, and the like will be described later.

(P2P Network 200)

The P2P network 200 is the network over which the P2P database is distributed. As described above, each of the node devices 100 is connected to the P2P network 200 to be able to update the P2P database, while maintaining integrity with the P2P database held by another node device 100.

Note that a type of the P2P network 200 is not particularly limited. For example, the P2P network 200 may also be of any of a consortium type operated by a plurality of organizations, a private type operated by a single organization, or a public type which does not particularly limit participants.

Note that types of a communication method and a line which are used by the P2P network 200 are not particularly limited. For example, the P2P network 200 may also be implemented by a dedicated network such as an IP-VPN (Internet Protocol-Virtual Private Network). Alternatively, the P2P network 200 may also be implemented by a public network such as the Internet, a telephone network, or a satellite communication network, various LANs (Local Area Networks) including the Ethernet (registered trademark), a WAN (Wide Area Network), or the like. Still alternatively, the P2P network 200 may also be implemented by a wireless communication network such as the Wi-Fi (registered trademark), Bluetooth (registered trademark), or the like.

The description has been given heretofore of the example of the system configuration of the information processing system according to the first embodiment. Note that the system configuration described above with reference to FIG. 4 is only exemplary, and the system configuration of the information processing system according to the first embodiment is not limited to that in such an example. The system configuration of the information processing system according to the first embodiment can flexibly be modified depending on specifications and operation.

(2. 2. Example of Functional Configurations of Node Device 100)

The description has been given above of the example of the system configuration of the information processing system according to the first embodiment. Subsequently, referring to FIG. 5, a description will be given of an example of functional configurations of each of the node devices 100.

Figure 5:
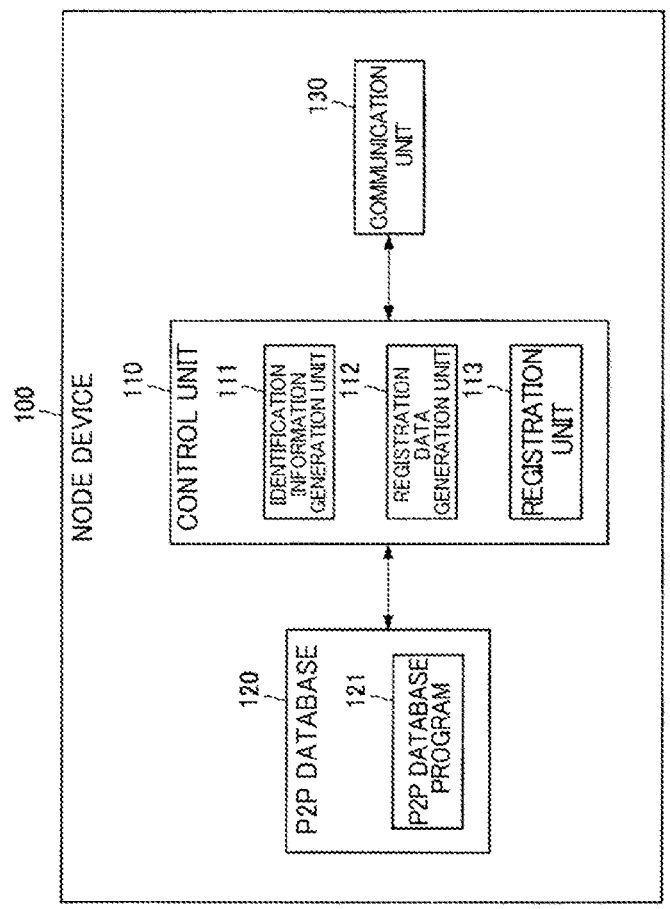
FIG. 5 is a block diagram illustrating an example of functional configurations of a node device 100 according to the first embodiment.

As illustrated in FIG. 5, the node device 100 includes a control unit 110, a P2P database 120, and a communication unit 130.

(Control Unit 110)

The control unit 110 is the functional configuration that generally controls general processing to be performed by the node device 100. For example, the control unit 110 can control various processing such as processing of generating the encrypted identification information, processing of generating the registration data, and processing of registering the registration data. Note that details of the control by the control unit 110 are not limited thereto. For example, the control unit 110 may also control processing (such as, e.g., processing related to an OS (Operating System)) generally performed in various servers, versatile computers, PCs (Personal Computers), tablet PCs, and the like.

As illustrated in FIG. 5, the control unit 110 includes an identification information generation unit 111, a registration data generation unit 112, and a registration unit 113.

(Identification Information Generation Unit 111)

The identification information generation unit 111 is the functional configuration that performs the encryption using the key information to generate the encrypted identification information. More specifically, the identification information generation unit 111 generates encrypted identification information by encrypting data stored in the registration data using the key information.

The "key information" used herein to generate the encrypted identification information may be one of common key information sets used in common at the time of encryption and at the time of decryption. More specifically, a company holding the node device 100 and an individual (subject) related to the registration data have the same common key information sets. Note that, when there are a plurality of the individuals (subjects) related to the registration data, different common key information sets are provided for the respective individuals (subjects).

Figure 6:
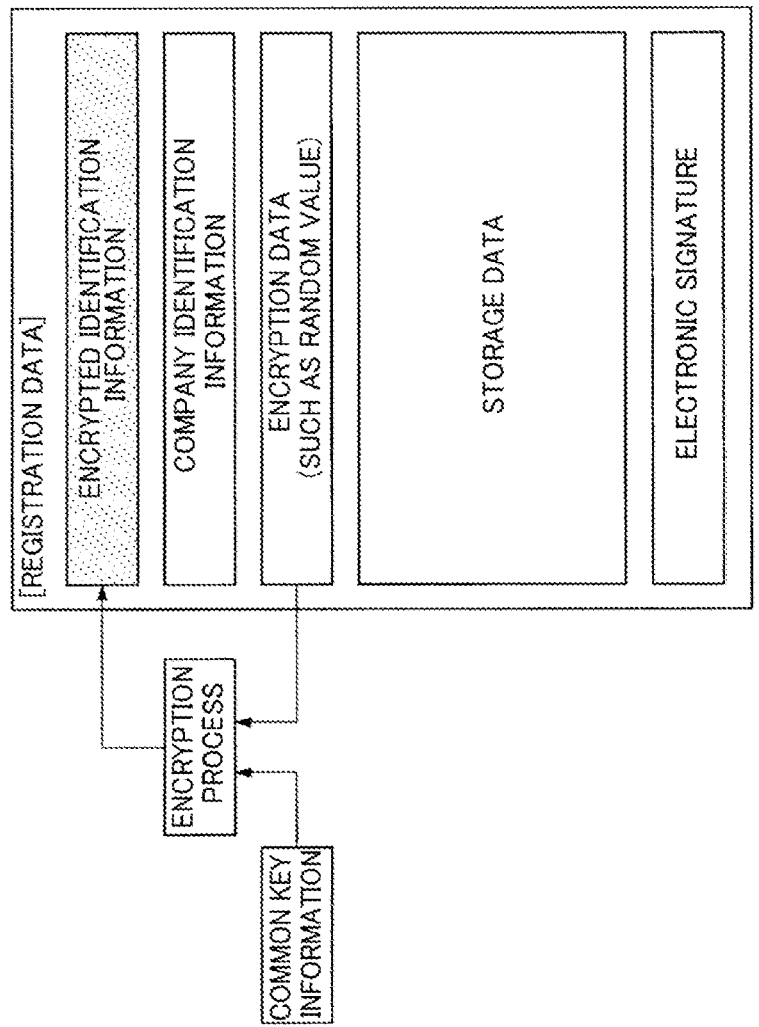
FIG. 6 is a diagram illustrating an example of a configuration of a registration data and a method of generating encrypted identification information.

The "data stored in the registration data" used to generate the encrypted identification information may be data generated for the encryption using the key information and may have a random value for each registration data. Referring to FIG. 6, a description will be given herein of a specific example of the "data stored in the registration data" used to generate the encrypted identification information.

FIG. 6 illustrates an example of a configuration of the registration data. For example, as illustrated in FIG. 6, the registration data includes the encrypted identification information, company identification information, encryption data, storage data, and the electronic signature. The encryption data in FIG. 6 is the data generated for the encryption using the key information and has a random value for each registration data (in other words, the encryption data is used as the "data stored in the registration data" used to generate the encrypted identification information).

It is assumed that the encryption data has, e.g., a random value generated by a predetermined program (such as, e.g., a random generator) held by the identification information generation unit 111, a random value specified by the individual (subject) related to the registration data, or a random value generated by an external device (such as, e.g., a server having a random generator, but the generator of the random value is not limited to the external device and may also be an external system, an external service, or the like). Note that, in the present embodiment, an example in which the encryption data is a random value, but the encryption data is not necessarily limited thereto. For example, the encryption data may also have a sequential value updated for each registration data, a hash value or hash values of any or all of the registration data, or the like.

Then, as illustrated in FIG. 6, the identification information generation unit 111 inputs the common key information sets and the encryption data to a predetermined encryption process to receive an output of the encrypted identification information. Note that "inputting the common key information sets and the encryption data to the predetermined encryption process to receive the output of the encrypted identification information" is equivalent to "encrypting the encryption data by using the common key information sets".

Due to the encryption data having a random value for each registration data, the encrypted identification information has a value that is different for each registration data. In addition, an individual or a company having the common key information sets can specify the individual (subject) related to the registration data by decrypting the encrypted identification information by using the common key information sets. Thus, the present disclosure allows a party (the individual and the company) to specify the individual (subject) and can also appropriately prevent the individual (subject) from being specified by the third person. The use of the common key information sets allows higher-speed processing and a lower cost. In other words, it can be said that, as a data amount of the data to be subjected to encryption (the encryption data in the example in FIG. 6) is larger, the use the common key information sets is more desirable in terms of a processing speed.

Note that, when there are a plurality of the registration data each having the same combination of the encryption data and the encrypted identification information, the risk grows that the third person could specify the individual (subject) (when the registration data are related to the same individual) or it becomes difficult for the party (the individual and the company) to specify the individual (subject) (when the registration data are related to different individuals). Accordingly, when the registration data is generated, the identification information generation unit 111 may also check whether or not the combination of the encryption data and the encrypted identification information is the same as that of another registration data. When the combination of the encryption data and the encrypted identification information is the same as that of another registration data, the identification information generation unit 111 may also perform predetermined avoidance processing (such as, e.g., giving of predetermined warning or re-generation of the encryption data).

The node device 100 need not hold the common key information sets and, in this case, an external device (such as an external server or a device operated by an individual) having the common key information sets may also generate the encrypted identification information. For example, when there is a key management service which manages the common key information sets, the external server that implements the service may use the common key information sets to generate the encrypted identification information or the device operated by the individual may use the common key information sets to generate the encrypted identification information. As a result, it is possible to generate the encrypted identification information without giving key information (the common key information in the example in FIG. 6) to the company holding the node device 100.

Figure 7:
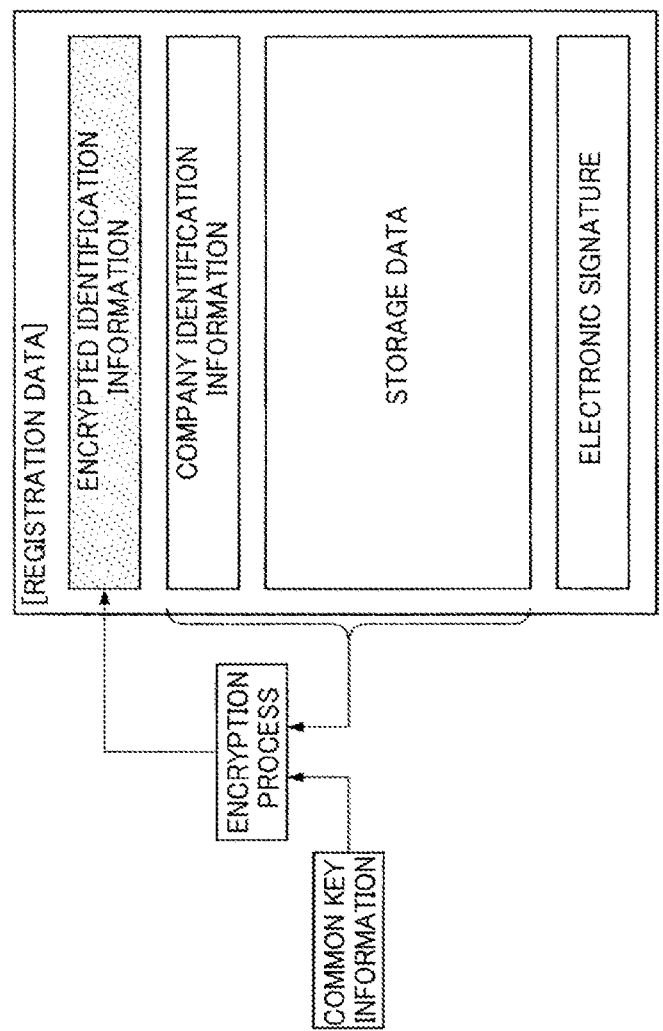
FIG. 7 is a diagram illustrating the example of the configuration of the registration data and the method of generating the encrypted identification information.

The description has been given of the case where, in FIG. 6, the "data stored in the registration data" used to generate the encrypted identification information is the data generated for the encryption and has the random value for each registration data. However, the "data stored in the registration data" is not necessarily limited thereto. More specifically, as illustrated in FIG. 7, as the "data stored in the registration data" used to generate the encrypted identification information, another data other than the encryption data may also be used (in the example in FIG. 7, the company identification information and the storage data are used but, needless to say, the "data stored in the registration data" is not limited thereto). In other words, the "data stored in the registration data" need not be the data generated for the encryption and need not have the random value for each registration data. In the example in FIG. 7, when the combination of the company identification information and the storage data is different from that of another registration data, the encrypted identification information generated by using these information sets is also different from the encrypted identification information in the other registration data, and consequently the individual (subject) is prevented from being specified by the third person.

(Registration Data Generation Unit 112)

The registration data generation unit 112 is the functional configuration that generates the registration data including the encrypted identification information. As illustrated in, e.g., FIG. 6, the registration data generation unit 112 acquires the encrypted identification information, the company identification information, the encryption data, and the storage data, encrypts any or all of these information sets by using the secret key of the holder company to generate an electronic signature, and stores these information sets including the electronic signature in the registration data. This allows the company to, e.g., decrypt the electronic signature by using the company identification information functioning as the public key of the company and thereby recognize the presence or absence of spoofing (i.e., it is possible to prevent spoofing). Note that a method of generating the electronic signature is not limited to a public key encryption method. Also, the public key for the decryption need not be the company identification information.

It is not necessarily required that all the various information sets stored in the registration data are generated by the registration data generation unit 112. For example, the storage data may also be provided from the external device (such as, e.g., the external server or the device operated by the individual. Note that a provider of the storage data is not limited to the external device, and may also be an external system, the external service, or the like).

(Registration Unit 113)

The registration unit 113 is the functional configuration that registers each registration data in the P2P database 120. More specifically, the registration unit 113 cooperates with a P2P database program 121 to implement the registration of the registration data in the P2P database 120. Note that the registration unit 113 may also use an algorithm for processing to determine whether or not the registration of the registration data is possible, registration timing, or the like.

(P2P Database 120)

The P2P database 120 is the database held in common by the individual node devices 100 and is, e.g., blockchain data. By being registered in the P2P database 120, each registration data has authenticity thereof guaranteed. Note that details of the registration data registered in the P2P database 120 are not particularly limited. For example, in a case where charging is performed when the registration data is acquired from the P2P database 120 or when the registration data is registered in the P2P database 120, data related to assets (such as, e.g., coins in Bitcoin) held by each of individuals may also be registered in the P2P database 120. Alternatively, the registration data may also be encrypted by a predetermined encryption method.

As illustrated in FIG. 5, the P2P database 120 includes the P2P database program 121.

(P2P Database Program 121)

The P2P database program 121 is the predetermined program provided in the P2P database 120 executed in the P2P database 120. The use of the P2P database program 121 allows, e.g., various types of processing including a transaction of virtual currency such as Bitcoin implemented in accordance with a predetermined rule, while maintaining consistency. A description will be given of the predetermined rule. For example, when data is registered or when data is acquired, the P2P database program 121 may also cooperate with another node device 100 to perform approval processing, charging processing, or the like based on the predetermined rule. In addition, the provision of the P2P database program 121 in the P2P database 120 reduces the risk that the program is illegally altered. The P2P database program 121 is a chaincode in a hyperledger, but is not limited thereto. For example, the P2P database program 121 may also indicate a smart contract.

The P2P database program 121 can implement general processing performed on the P2P database 120. For example, the P2P database program 121 can implement processing of acquiring the registration data, processing of registering the registration data, and the like each performed by accessing the P2P database 120. Note that the processing implemented by the P2P database program 121 is not limited to that described above. Also, a development language for the P2P database program 121, the number of the P2P database programs 121 provided in the P2P database 120, and the like are not particularly limited.

(Communication Unit 130)

The communication unit 130 is the functional configuration that performs communication with the external device. For example, the communication unit 130 receives a signal from the external device (such as, e.g., the external server or the device operated by the individual) or transmits the registration data acquired from the P2P database 120 to the external device. Additionally, in communication with another node device 100, the communication unit 130 transmits/receives data used to update the P2P database 120 (such as, e.g., data to be used for consensus) or the like. Note that the information communicated by the communication unit 130 through communication and a case where the communication unit 130 performs communication are not limited thereto.

The description has been given heretofore of the example of the functional configurations of each of the node devices 100. Note that the functional configurations described above using FIG. 5 are only exemplary, and the functional configurations of the node device 100 are not limited to those in such an example. For example, the node device 100 need not necessarily include all the functional configurations illustrated in FIG. 5. In addition, the functional configurations of the node device 100 can flexibly be modified depending on specifications and operation.

(2. 3. Example of Flow of Processing)

Figure 8:
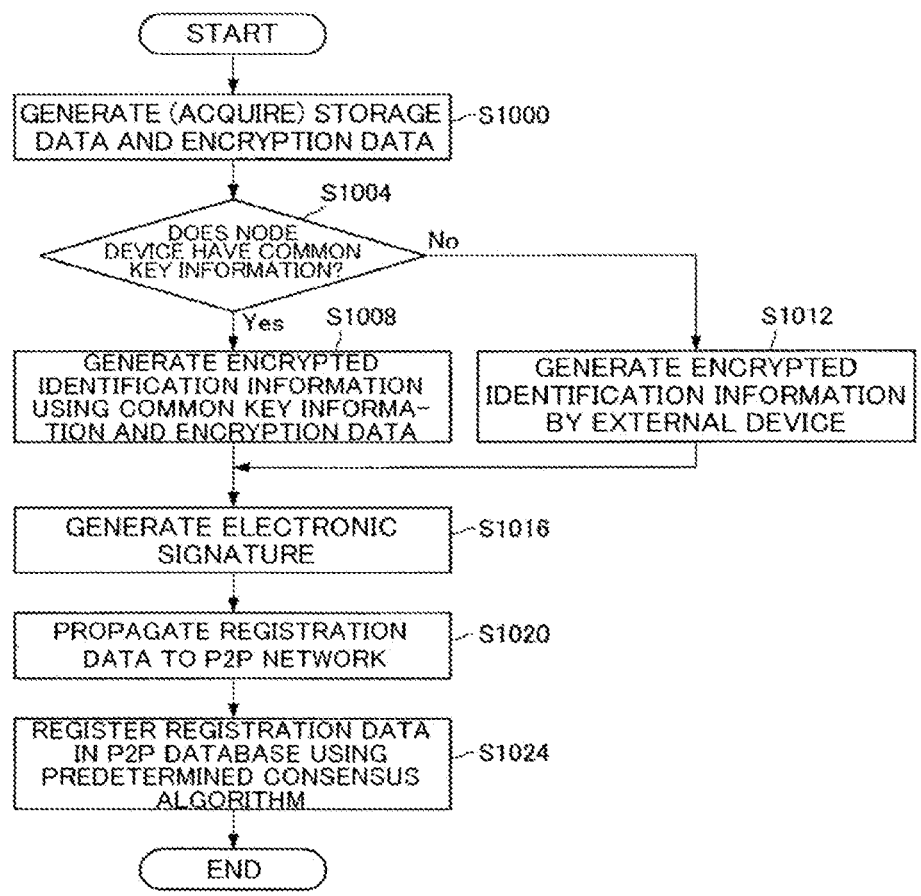
FIG. 8 is a flow chart illustrating a specific example of processing in which the node device 100 according to the first embodiment registers each registration data in a P2P database 120.

The description has been given above of the example of the functional configurations of each of the node devices 100. Subsequently, referring to FIG. 8, a description will be given of an example of a flow of processing by the node device 100. FIG. 8 is a flow chart illustrating a specific example of processing in which the node device 100 registers each registration data in the P2P database 120.

In Step S1000, the registration data generation unit 112 generates (or acquires) the storage data, and the identification information generation unit 111 generates (or acquires) the encryption data. When the node device 100 has the common key information sets (Yes in Step S1004), in Step S1008, the identification information generation unit 111 generates the encrypted identification information by using the common key information sets and the encryption data. More specifically, the identification information generation unit 111 inputs the common ken information sets and the encryption data to the predetermined encryption process to receive the output of the encrypted identification information. When the node device 100 does not have the common key information sets (No in Step S1004), in Step S1012, the external device (such as, e.g., the external server or the device operated by the individual) generates the encrypted identification information, and the identification information generation unit 111 acquires the generated encrypted identification information.

In Step S1016, the registration data generation unit 112 acquires the encrypted identification information, the company identification information, the encryption data, and the storage data and encrypts any or all of these information sets by using the secret key of the holder company to generate the electronic signature. In Step S1020, the registration unit 113 cooperates with the P2P database program 121 to cause the registration data including the electronic signature to propagate (broadcast) to the P2P network 200 so as to register the registration data in the P2P database 120. In Step S1024, the P2P database program 121 registers the registration data in the P2P database 120 by using a predetermined consensus algorithm, whereby a sequence of processing is ended.

Note that the individual steps in the flow chart of FIG. 8 need not necessarily be performed in time series in the order in which the steps are described. In other words, the individual steps in the flow chart may be performed either in an order different from the order in which the steps are described or in parallel. Note that the same applies also to a flow chart and a sequence diagram each described below.

(2. 4. Modification)

The description has been given above of the example of the flow of the processing by the node device 100. Subsequently, a description will be given of a modification according to the first embodiment.

In the description given above, the common key information is used to generate the encrypted identification information. Meanwhile, in the modification according to the first embodiment, an encryption key information set which is included in a pair of pair key information sets used at the time of encryption and at the time of decryption and which is used at the time of encryption is used to generate the encrypted identification information.

Figure 9:
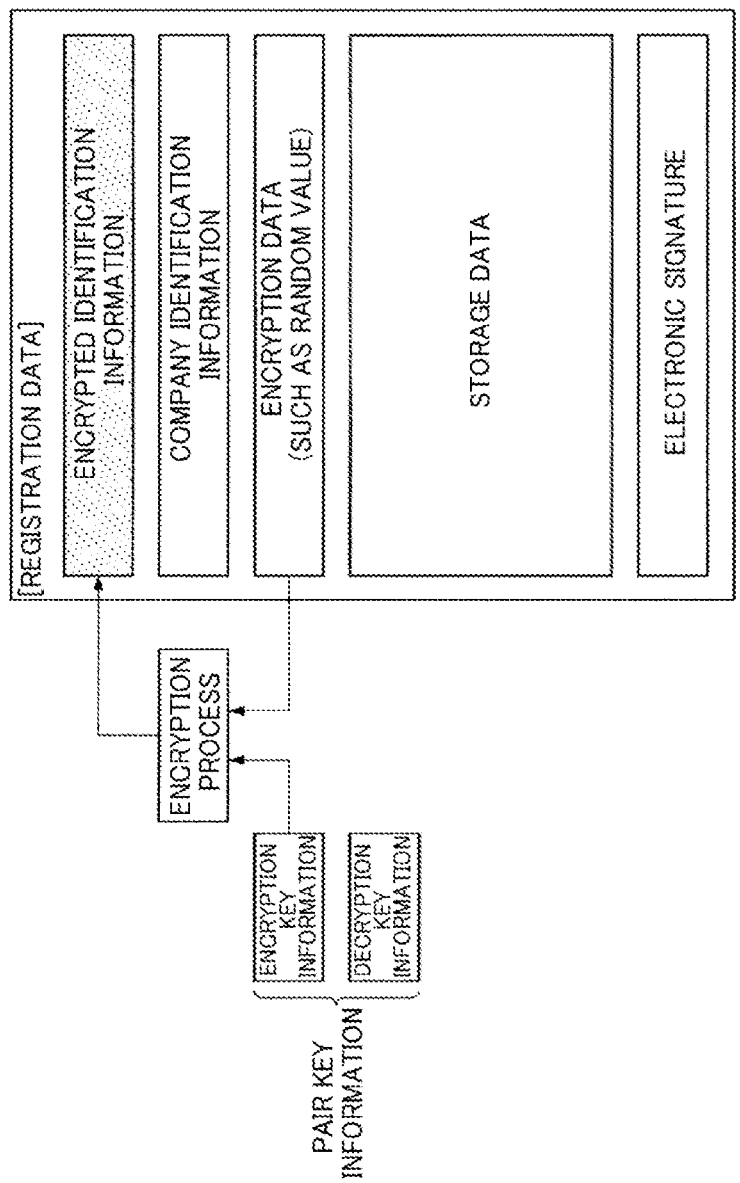
FIG. 9 is a diagram illustrating a method of generating the encrypted identification information according to a modification of the first embodiment.

A more specific description will be given with reference to FIG. 9. The pair key information sets used in the modification include the encryption key information set used at the time of encryption and a decryption key information set used at the time of decryption. Then, as illustrated in FIG. 9, the identification information generation unit 111 inputs the encryption key information set and the encryption data to the predetermined encryption process to receive the output of the encrypted identification information. It is to be noted that "inputting the encryption key information set and the encryption data to the predetermined encryption process to receive the output of the encrypted identification information" is equivalent to "encrypting the encryption data by using the encryption key information set".

The "pair key information sets" mentioned herein may be, e.g., a secret key information set and a public key information set each used for a public key code, but is not necessarily limited thereto. It is also to be noted that, even if the secret key information set and the public key information set are used as the "pair key information sets", in order to prevent the individual (subject) related to the registration data from being specified by the third person, the public key information set is not a key information set which is widely published to the public, but is a key information set which is basically known only to the individual and the company.

Then, the individual having the decryption key information set included in the pair key information sets decrypts the encrypted identification information by using the decryption key information set and can thus specify the individual (subject) related to the registration data (needless to say, the company having the encryption key information set can also specify the individual (subject) related to the registration data by using the encryption key information set). Thus, the present disclosure allows the party (the individual and the company) to specify the individual (subject) and can also more appropriately prevent the individual (subject) from being specified by the third person. In addition, as in the modification, the use of the pair key information sets can implement more robust encryption. Note that, in the encryption using the encryption key information set (e.g., public key information set) of the pair key information sets, more complicated calculation processing is performed, and a data amount of the encrypted identification information is likely to increase. Accordingly, it can be said that, when the pair key information sets are used, in terms of a processing speed and the data amount, it is more desirable for data subjected to the encryption (the encryption data in the example in FIG. 9) to have a smaller data amount.

Figure 10:
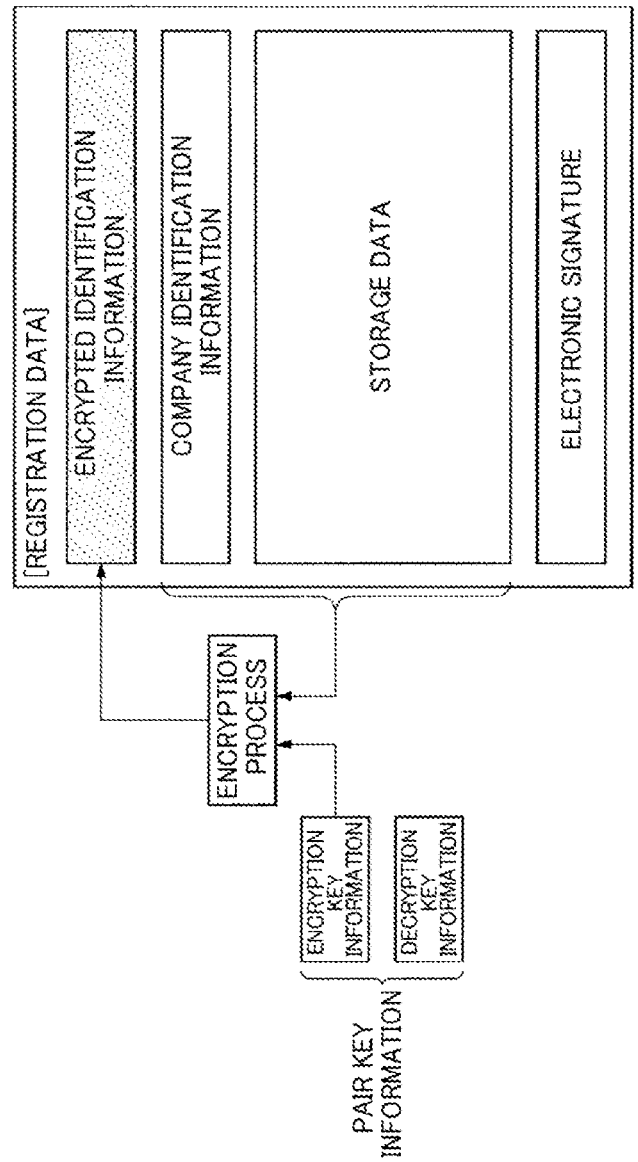
FIG. 10 is a diagram illustrating the method of generating the encrypted identification information according to the modification of the first embodiment.

Note that, as illustrated in FIG. 10, in the modification also, as the "data stored in the registration data" used to generate the encrypted identification information, data other than the encryption data may also be used (in the example in FIG. 10, the company identification information and the storage data are used but, needless to say, the "data stored in the registration data" is not limited thereto).

3. Second Embodiment

The description has been given above of the first embodiment according to the present disclosure. Subsequently, a description will be given of the second embodiment according to the present disclosure. Note that an example of a system configuration according to the second embodiment may be the same as the example of the system configuration according to the first embodiment described above, and therefor a description thereof is omitted.

(3. 1. Example of Functional Configurations of Node Device 100)

Figure 11:
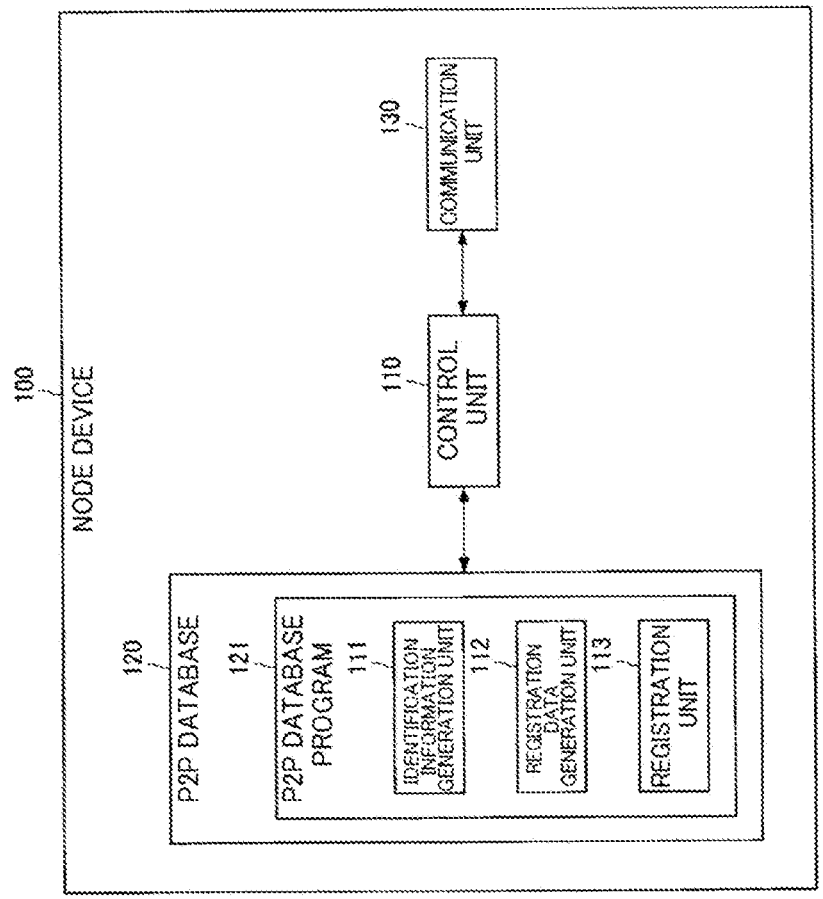
FIG. 11 is a block diagram illustrating an example of functional configurations of the node device 100 according to a second embodiment.

First, referring to FIG. 11, a description will be given of an example of functional configurations of each of the node devices 100 according to the second embodiment.

In the second embodiment, the processing of generating the encrypted identification information, the processing of generating the registration data, and the processing of registering the registration data are implemented by the P2P database program 121 (as described above, the predetermined program provided in the P2P database 120 executed in the P2P database 120). In other words, as illustrated in FIG. 11, the identification information generation unit 111, the registration data generation unit 112, and the registration unit 113 are all included in the P2P database program 121. Note that not all the identification information generation unit 111, the registration data generation unit 112, and the registration unit 113 are required to be implemented by the P2P database program 121, but it is assumed that at least the registration data generation unit 112 is implemented by the P2P database program 121. By allowing these units implemented by the P2P database program 121, it is possible to prevent fraud resulting from alteration of the program and also automate each of the processing steps performed by all the node devices 100 in accordance with a predetermined rule.

Functions of the individual functional configurations according to the second embodiment may be the same as functions of the individual functional configurations according to the first embodiment described above, and therefore a description thereof is omitted.

(3. 2. Example of Flow of Processing)

Figure 12:
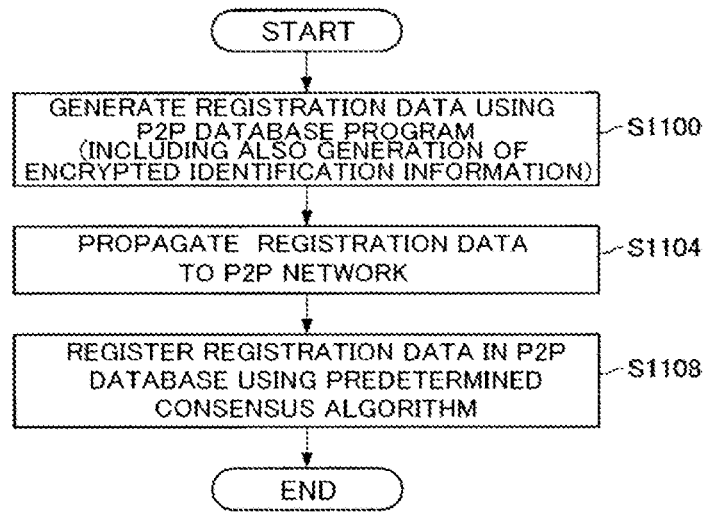
FIG. 12 is a flow chart illustrating a specific example of processing in which the node device 100 according to the second embodiment registers each registration data in the P2P database 120.

The description has been given above of the example of the functional configurations of each of the node devices 100 according to the second embodiment. Subsequently, referring to FIG. 12, a description will be given of an example of a flow of processing by the node device 100 according to the second embodiment. FIG. 12 is a flow chart illustrating a specific example of the processing in which the node device 100 according to the second embodiment registers each registration data in the P2P database 120.

In the second embodiment, the processing of generating the registration data in the processing in the first embodiment described with reference to FIG. 8 (processing in Steps S1000 to Step S1016 is FIG. 8) is also performed by the P2P database program 121. More specifically, in Step S1100 in FIG. 12, the P2P database program 121 performs generation of the registration data (including also the generation of the encrypted identification information). Then, in Step S1104, the P2P database program 121 causes the registration data to propagate (broadcast) to the P2P network 200 so as to register the registration data in the P2P database 120. In Step S1108, the P2P database program 121 registers the registration data in the P2P database 120 by using a predetermined consensus algorithm, whereby a sequence of processing is ended.

While the description has been given heretofore of the second embodiment according to the present disclosure, it is to be noted that the various techniques described in the first embodiment are also applicable to the second embodiment. For example, in the second embodiment also, as the "data registered in the registration data" used to generate the encrypted identification information, data other than the encryption data (such as, e.g., the company identification information and the storage data as in the example in FIG. 7) may also be used. Alternatively, not only the common key information sets, but also the pair key information sets may also be used.

4. Third Embodiment

The description has been given above of the second embodiment according to the present disclosure. Subsequently, a description will be given of a third embodiment according to the present disclosure.

(4. 1. Example of System Configuration)

Figure 13:
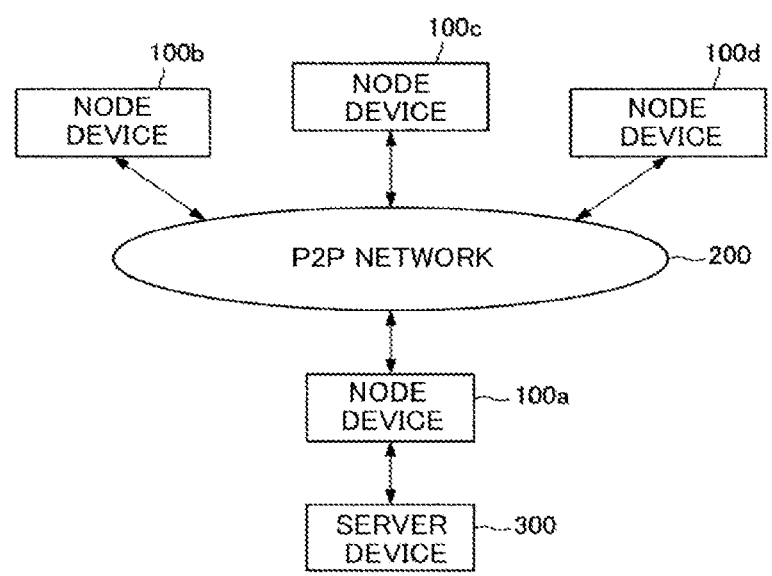
FIG. 13 is a diagram illustrating an example of a system configuration of an information processing system according to a third embodiment.

First, referring to FIG. 13, a description will be given of an example of a system configuration of an information processing system according to the third embodiment. As illustrated in FIG. 13, the information processing system according to the third embodiment includes not only the node devices 100 and the P2P network 200, but also a server device 300 (the information processing device). The server device 300 is communicatively connected to the node device 100 (the node device 100a in the drawing).

In each of the first embodiment and the second embodiment described above, each of the node devices 100 basically performs the processing of generating the encrypted identification information, the processing of generating the registration data, and the processing of registering the registration data. However, such processing need not necessarily be performed by the node device 100. Accordingly, in the third embodiment, a description will be given of a case where the node device 100 and the server device 300 implement the various functions described above through distributed processing.

Note that the system configuration illustrated in FIG. 13 is only exemplary, and the system configuration of the information processing system according to the third embodiment is not limited to that in such an example. For example, it may also be possible that an external device other than the node devices 100 and the server device 300 is further provided, and the node devices 100, the server device 300, and the external device perform distributed processing. The system configuration of the information processing system according to the third embodiment can flexibly be modified depending on specifications and operation.

(4. 2. Example of Functional Configurations of Node Device 100)

Subsequently, referring to FIG. 14, a description will be given of an example of functional configurations of each of the node devices 100 according to the third embodiment. The following will describe a case where, as an example of the distributed processing by the node device 100 and the server device 300, the server device 300 performs the processing of generating the encrypted identification information and the registration data, and then the node device 100 performs the processing of registering the registration data.

Figure 14:
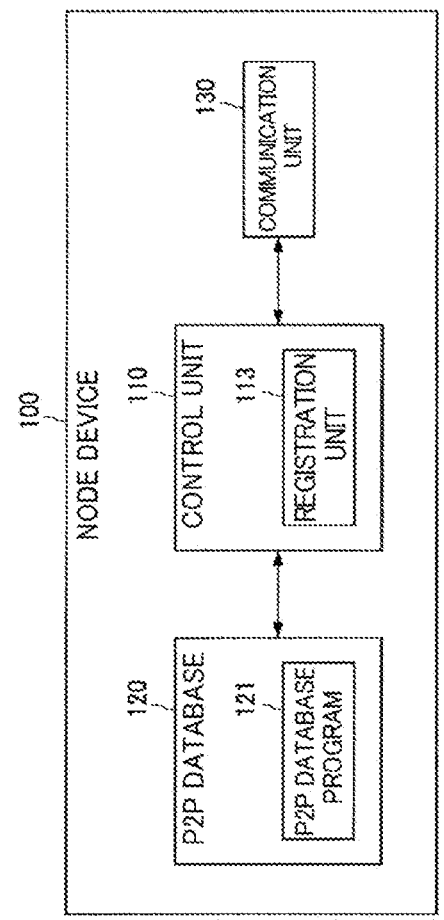
FIG. 14 is a block diagram illustrating an example of functional configurations of the node device 100 according to the third embodiment.

Specifically, as illustrated in FIG. 14, the control unit 110 of the node device 100 does not include the identification information generation unit 111 and the registration data generation unit 112 (compared to that in the example of the functional configurations of the node device 100 according to the first embodiment illustrated in FIG. 5), but includes only the registration unit 113.

Note that the functional configurations illustrated in FIG. 14 are only exemplary, and the functional configurations of the node device 100 according to the third embodiment are not limited to those in such a case. In addition, the functional configurations of the node device 100 according to the third embodiment can flexibly be modified depending on specifications and operation.

(4. 3. Example of Functional Configurations of Server Device 300)

Subsequently, referring to FIG. 15, a description will be given of an example of functional configurations of the server device 300 according to the third embodiment.

Figure 15:
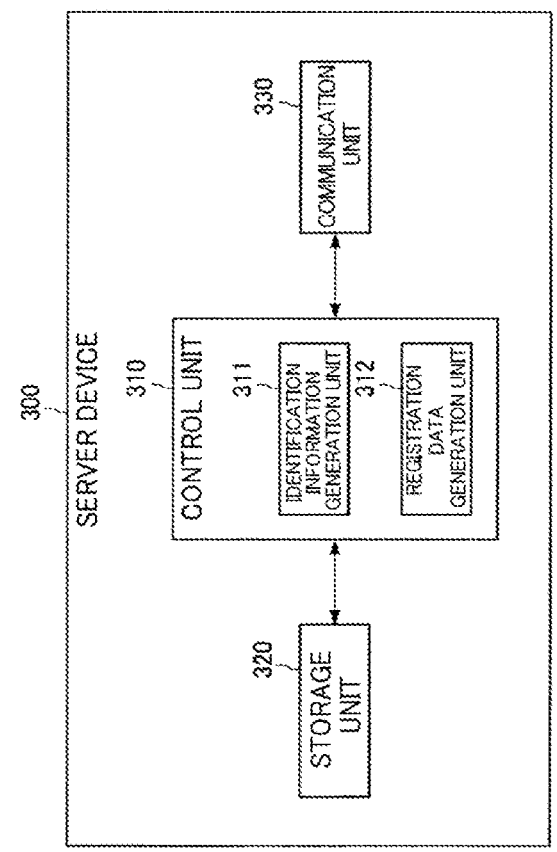
FIG. 15 is a block diagram illustrating an example of functional configurations of a server device 300 according to the third embodiment.

As illustrated in FIG. 15, the server device 300 includes a control unit 310, a storage unit 320, and a communication unit 330.

(Control Unit 310)

The control unit 310 is the functional configuration that generally controls general processing performed by the server device 300. For example, the control unit 310 can control various processing such as the processing of generating the encrypted identification information and the processing of generating the registration data. Note that details of the control by the control unit 310 are not limited thereto. For example, the control unit 310 may also control processing (such as, e.g., processing related to an OS) generally performed in various servers, versatile computers, PCs, tablet PCs, or the like.

As illustrated in FIG. 15, the control unit 310 includes an identification information generation unit 311 and a registration data generation unit 312. Respective functions of the identification information generation unit 311 and the registration data generation unit 312 are the same as the respective functions of the identification information generation unit 111 and the registration data generation unit 112 each provided in the node device 100 according to the first embodiment, and therefore a description thereof is omitted.

(Storage Unit 320)

The storage unit 320 is the functional configuration that stores various information. For example, the storage unit 320 stores the key information (the common key information sets or the encryption key information set included in the pair key information sets) used to generate the encrypted identification information, the generated encrypted identification information, the generated registration data, or the like and stores programs, parameters, and the like used by the individual functional configurations of the server device 300. Note that the information stored by the storage unit 320 is not limited thereto.

(Communication Unit 330)

The communication unit 330 is the functional configuration that performs communication with an external device. For example, the communication unit 330 transmits, to the node device 100, the generated registration data and receives, from the node device 100, the registration data acquired from the P2P database 120. Note that the information communicated by the communication unit 330 through communication and a case where the communication unit 330 performs communication are not limited thereto.

Note that the functional configurations illustrated in FIG. 15 are only exemplary, and the functional configurations of the server device 300 according to the third embodiment are not limited to those in such an example. For example, when an external device other than the node devices 100 and the server device 300 is further provided and distributed processing including also the external device is performed, any (such as, e.g., the identification information generation unit 311 or the registration data generation unit 312) of the functional configurations of the server device 300 may also be provided in the external device. The functional configurations of the server device 300 according to the third embodiment can flexibly be modified depending on specifications and operation.

(4. 4. Example of Flow of Processing)

Figure 16:
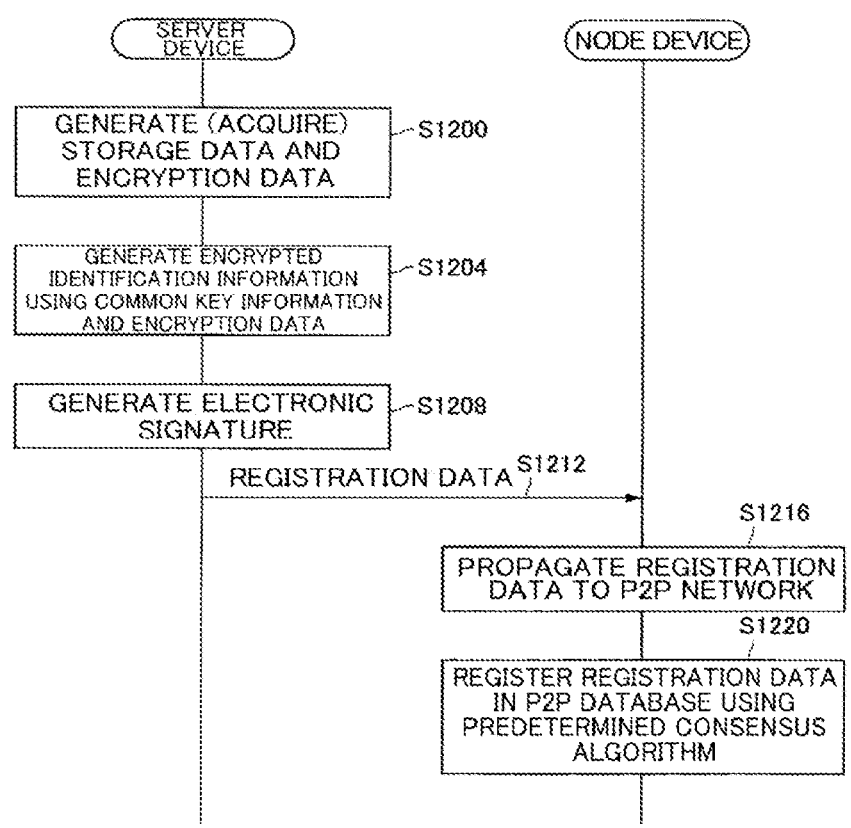
FIG. 16 is a flow chart illustrating a specific example of processing in which the server device 300 generates registration data and the node device 100 registers the registration data in the P2P database 120 in the third embodiment.

The description has been given above of the example of the functional configurations of the server device 300 according to the third embodiment. Subsequently, referring to FIG. 16, a description will be given of an example of a flow of processing by the node device 100 and the server device 300 each according to the third embodiment. FIG. 16 is a flow chart illustrating a specific example of processing in which the server device 300 generates each registration data, and the node device 100 registers the registration data in the P2P database 120.

In the third embodiment, the processing of generating the registration data (processing in Steps S1000 to S1016 in FIG. 8) in the processing in the first embodiment described with reference to FIG. 8 is performed by the server device 300. More specifically, in Step S1200 in FIG. 16, the registration data generation unit 312 of the server device 300 generates (or acquires) the storage data, and the identification information generation unit 311 of the server device 300 generates (or acquires) the encryption data.

In Step S1204, the identification information generation unit 311 generates the encrypted identification information by using the common key information sets and the encryption data. More specifically, the identification information generation unit 311 inputs the common key information sets and the encryption data to a predetermined encryption process to receive an output of the encrypted identification information (note that, in an example in FIG. 16, only a case where the server device 300 has the common key information sets is illustrated for the sake of convenience, and therefore conditional branching in Step S1004 illustrated in FIG. 8 is omitted. Needless to say, processing related to the conditional branching may also be performed).

In Step S1208, the registration data generation unit 312 acquires the encrypted identification information, the company identification information, the encryption data, and the storage data and encrypts any or all of these information sets by using the secret key of the holder company to generate the electronic signature and thereby generate the registration data.

In Step S1212, the communication unit 330 transmits the registration data to the node device 100. In Step S1216, the registration unit 113 of the node device 100 cooperates with the P2P database program 121 to cause the registration data to propagate (broadcast) to the P2P network 200 so as to register the registration data in the P2P database 120. In Step S1220, the P2P database program 121 registers the registration data in the P2P database 120 by using a predetermined consensus algorithm, whereby a sequence of processing is ended.

While the description has been given heretofore of the third embodiment according to the present disclosure, it is to be noted that the various techniques described in the first embodiment and the second embodiment are also applicable to the third embodiment. For example, in the third embodiment also, as the "data stored in the registration data" used to generate the encrypted identification information, data other than the encryption data (such as, e.g., the company identification information and the storage data as in the example in FIG. 7) may also be used. Additionally, not only the common key information sets, but also the pair key information sets may also be used. Moreover, any of the processing steps may also be implemented by the P2P database program 121.

5. Example of Hardware Configuration

The description has been given above of the third embodiment according to the present disclosure. Subsequently, referring to FIG. 17, a description will be given of an example of a hardware configuration of each of the devices according to the first to third embodiments described above.

Figure 17:
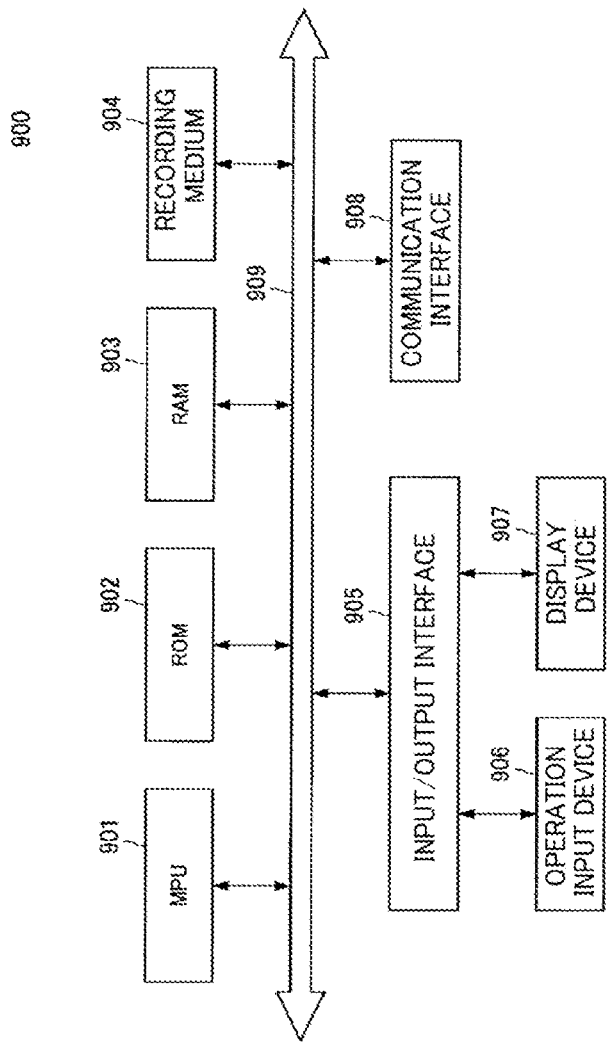
FIG. 17 is a block diagram illustrating an example of a hardware configuration of an information processing device 900 which embodies the node device 100 according to the first to third embodiments or the server device 300 according to the third embodiment.

FIG. 17 is a block diagram illustrating an example of a hardware configuration of an information processing device 900 which embodies each of the node devices 100 according to the first to third embodiments or the server device 300 according to the third embodiment.

For example, the information processing device 900 includes an MPU 901, a ROM 902, a RAM 903, a recording medium 904, an input/output interface 905, an operation input device 906, a display device 907, and a communication interface 908. The information processing device 900 also provides connection between the individual components via a bus 909 serving as a data transmission path.

The MPU 901 includes one or two or more processors each formed of, e.g., an arithmetic circuit such as an MPU, various processing circuits, and the like to function as the control unit 110 of the node device 100 or the control unit 310 of the server device 300. Note that the control unit 110 of the node device 100 or the control unit 310 of the server device 300 may also be formed of a dedicated (or versatile) circuit (such as a processor provided separately from the MPU 901) capable of implementing the various processing described above.

The ROM 902 stores programs used by the MPU 901, control data such as arithmetic parameters, and the like. The RAM 903 temporarily stores, e.g., the programs executed by the MPU 901.

The recording medium 904 functions as the P2P database 120 of the node device 100 or the storage unit 320 of the server device 300 and stores various data such as data and various programs each related to information processing according to the present embodiment. As examples of the recording medium 904, a magnetic recording medium such as a hard disk and a nonvolatile memory such as a flash memory can be listed. The recording medium 904 may also be detachable from the information processing device 900.

For example, the input/output interface 905 connects the operation input device 906 and the display device 907. As examples of the input/output interface 905, a USB (Universal Serial Bus) terminal, a DVI (Digital Visual Interface) terminal, a HDMI (registered trademark) (High-Definition Multimedia Interface) terminal, various processing circuits, and the like can be listed.

For example, the operation input device 906 is provided in the information processing device 900 to be connected to the input/output interface 905 in the information processing device 900. As examples of the operation input device 906, a keyboard, a mouse, a keypad, a touch panel, a microphone, an operation button, a rotary selector such as a direction key or a jog dial, a combination thereof, and the like can be listed.

For example, the display device 907 is provided in the information processing device 900 to be connected to the input/output interface 905 in the information processing device 900. As examples of the display device 907, a liquid crystal display, an organic EL (electro-luminescence) display, and the like can be listed.

Needless to say, the input/output interface 905 can be connected to an external device such as an operation input device outside the information processing device 900 and an external display device. The display device 907 may also be a device capable of performing a displaying operation and receiving a user operation, such as a touch panel.

The communication interface 908 is a communication means provided in the information processing device 900 to function as the communication unit 130 of the node device 100 or the communication unit 330 of the server device 300. The communication interface 908 may also have a function of performing wireless or wired communication with any given external device such as, e.g., a server via any given network (or directly). As an example of the communication interface 908, a communication antenna and an RF (Radio Frequency) circuit (wireless communication), an IEEE 802.15.1 port and a transmission/reception circuit (wireless communication), an IEEE 802.11 port and a transmission/reception circuit (wireless communication), a LAN (Local Area Network) terminal and a transmission/reception circuit (wired communication), or the like can be listed.

Note that a hardware configuration of the information processing device 900 is not limited to the configuration illustrated in FIG. 17. For example, when performing communication via an external communication device connected thereto, the information processing device 900 need not include the communication interface 908. Alternatively, the communication interface 908 may also have a configuration capable of performing communication using a plurality of communication methods. Still alternatively, the information processing device 900 need not include, e.g., the operation input device 906, the display device 907, or the like. Yet alternatively, the configuration illustrated in FIG. 17 may be partially or entirely implemented by one or two or more ICs (Integrated Circuits).

6. Summary

As has been described heretofore, each of the node devices 100 according to the first embodiment performs encryption using key information of the subject related to the registration data in the P2P database 120 to generate the encrypted identification information. Then, the node device 100 generates the registration data including the generated encrypted identification information and registers the registration data in the P2P database 120. It is to be noted herein that the encrypted identification information is the information used to identify the subject (subject related to the registration data in the P2P database 120), which differs for each registration data. Since the encrypted identification information is the information which differs for each registration data, even when one identification information set indicating the subject is published on a website or the like, the subject related to the registration data in the P2P database 120 is prevented from being specified by the third person.

Meanwhile, each of the node devices 100 according to the second embodiment implements any or all of the processing of generating the encrypted identification information, the processing of generating each registration data, and the processing of registering the registration data by using the P2P database program 121. Thus, the node device 100 according to the second embodiment can prevent fraud resulting from alteration of the program and can also automate each of the processing steps performed by all the node devices 100 in accordance with a predetermined rule.

Meanwhile, each of the node devices 100 and the server device 300 according to the third embodiment cooperate with each other to perform distributed processing and implement various functions (such as, e.g., the processing of generating the encrypted identification information, the processing of generating each registration data, and the processing of registering the registration data).

While the detailed description has been given heretofore of the preferred embodiments of the present disclosure with reference to the accompanying drawings, the technical scope of the present disclosure is not limited to those in such examples. It is clear that a person having ordinary knowledge in the technical field of the present disclosure can conceive of various modified examples or amended examples within the scope of the technical idea described in the claims, and it should be understood that these also belong to the technical scope of the present disclosure.

Note that the effects described in the present description are to be construed as merely descriptive or illustrative, and are not limitative. In other words, the technology according to the present disclosure can achieve, along with or instead of the above effects, other effects apparent to a person skilled in the art from the statement of the present description.

Note that configurations as shown below also belong to the technical scope of the present disclosure.

(1)

An information processing device including:

a registration data generation unit that generates registration data that is registered in a P2P database and that includes encrypted identification information generated through encryption using key information of a subject related to the registration data, the encrypted identification information being used to identify the subject and being different for each registration data.

(2)

The information processing device according to (1) described above, wherein the encrypted identification information is generated through the encryption of data stored in the registration data using the key information.

(3)

The information processing device according to (2) described above, wherein the data stored in the registration data is data generated for the encryption using the key information.

(4)

The information processing device according to (3) described above, wherein the data stored in the registration data has a random value for each registration data.

(5)

The information processing device according to any one of (1) to (4) described above, wherein the key information is one of common key information sets used in common at the time of the encryption and at the time of decryption or encryption key information which is one of a pair of mutually different pair key information sets respectively used at the time of the encryption and at the time of the decryption and which is used at the time of the encryption.

(6)

The information processing device according to any one of (1) to (5) described above, further including:

an identification information generation unit that performs the encryption using the key information to generate the encrypted identification information.

(7)

The information processing device according to any one of (1) to (6) described above, further including:

a registration unit that registers each registration data in the P2P database.

(8)

The information processing device according to (7) described above, wherein at least the registration data generation unit is included in the P2P database and implemented by a predetermined program executed in the P2P database.

(9)

The information processing device according to any one of (1) to (8) described above, wherein the P2P database is blockchain data.

(10)

An information processing method to be implemented by a computer, the information processing method including:

generating registration data that is registered in a P2P database and that includes encrypted identification information generated through encryption using key information of a subject related to the registration data, the encrypted identification information being used to identify the subject and being different for each registration data.

(11)

A program for causing a computer to execute:

generating registration data that is registered in a P2P database and that includes encrypted identification information generated through encryption using key information of a subject related to the registration data, the encrypted identification information being used to identify the subject and being different for each registration data.

(12)

An information processing device including:

a communication unit that receives each registration data registered in a P2P database, the registration data including encrypted identification information which is generated through encryption using key information of a subject related to the registration data; and a registration unit that registers each registration data in the P2P database, the encrypted identification information being used to identify the subject and being different for each registration data.

REFERENCE SIGNS LIST

100 Node device
110, 310 Control unit
111, 311 Identification information generation unit
112, 312 Registration data generation unit
113 Registration unit
120 P2P database
121 P2P database program
130, 330 Communication unit
200 P2P network
300 Server device
320 Storage unit

The invention claimed is:

1. An information processing device, comprising:
processing circuitry configured to
generate registration data that is to be registered in a peer-to-peer (P2P) database held in common by a plurality of node devices, including the information processing device, in a P2P network, the registration data including encrypted identification information generated through encryption using key information of a subject related to the registration data, wherein the encrypted identification information is generated through the encryption, using the key information, of particular data separately stored in a field in the registration data, the encrypted identification information being used to identify the subject and being different for each registration data; and
propagate the generated registration data to the P2P network so as to register the generated registration data in the P2P database.

2. The information processing device according to claim 1, wherein the particular data separately stored in the registration data is data generated for the encryption using the key information.

3. The information processing device according to claim 2, wherein the particular data separately stored in the registration data is a random value that is different for each registration data.

4. The information processing device according to claim 1, wherein the key information is one of common key information sets used in common at a time of the encryption and at a time of decryption, or encryption key information that is one of a pair of mutually different pair key information sets respectively used at the time of the encryption and at the time of the decryption and which is used at the time of the encryption.

5. The information processing device according to claim 1, wherein the processing circuitry is further configured to perform the encryption using the key information to generate the encrypted identification information.

6. The information processing device according to claim 1, wherein the processing circuitry is further configured to register each registration data in the P2P database.

7. The information processing device according to claim 6, wherein the processing circuitry is further configured to execute
a registration data generation module included in the P2P database and implemented by a predetermined program executed in the P2P database.

8. The information processing device according to claim 1, wherein the P2P database is blockchain data.

9. The information processing device of claim 1, wherein the processing circuitry is further configured to generate an electronic signature and separately store the generated electronic signature in the registration data, the electronic signature being different from the encrypted identification information and different from the particular data.

10. The information processing device of claim 9, wherein the processing circuitry is further configured to generate the electronic signature using a secret key different from the key information.

11. The information processing device of claim 1, wherein the processing circuitry is further configured to separately store transaction data in the registration data, the transaction data being different from the encrypted identification information and different from the particular data separately stored in the registration data.

12. An information processing method implemented by a computer, the information processing method comprising:

generating registration data that is to be registered in a peer-to-peer (P2P) database held in common by a plurality of node devices, including the information processing device, in a P2P network, the registration data including encrypted identification information generated through encryption using key information of a subject related to the registration data, wherein the encrypted identification information is generated through the encryption, using the key information, of particular data separately stored in a field in the registration data, the encrypted identification information being used to identify the subject and being different for each registration data; and propagating the generated registration data to the P2P network so as to register the generated registration data in the P2P database.

13. A non-transitory computer-readable medium storing a program that, when executed by a computer, causes the computer to execute a method, comprising:

generating registration data that is to be registered in a peer-to-peer (P2P) database held in common by a plurality of node devices, including the information processing device, in a P2P network, the registration data including encrypted identification information generated through encryption using key information of a subject related to the registration data, wherein the encrypted identification information is generated through the encryption, using the key information, of particular data separately stored in a field in the registration data, the encrypted identification information being used to identify the subject and being different for each registration data; and propagating the generated registration data to the P2P network so as to register the generated registration data in the P2P database.

14. An information processing device, comprising:

a communication circuit that receives registration data that is to be registered in a peer-to-peer (P2P) database held in common by a plurality of node devices, including the information processing device, in a P2P network, the registration data including encrypted identification information generated through encryption using key information of a subject related to the registration data, wherein the encrypted identification information is generated through the encryption, using the key information, of particular data separately stored in a field in the registration data; and processing circuitry configured to propagate the generated registration data to the P2P network so as to register the generated registration data in the P2P database, the encrypted identification information being used to identify the subject and being different for each registration data.

* * * * *